No. 717,079. Patented Dec. 30, 1902.
O. CLUTS.
DEVICE FOR TRANSMITTING ROTARY MOTION TO VEHICLE WHEELS.
(Application filed Aug. 2, 1902.)
(No Model.)
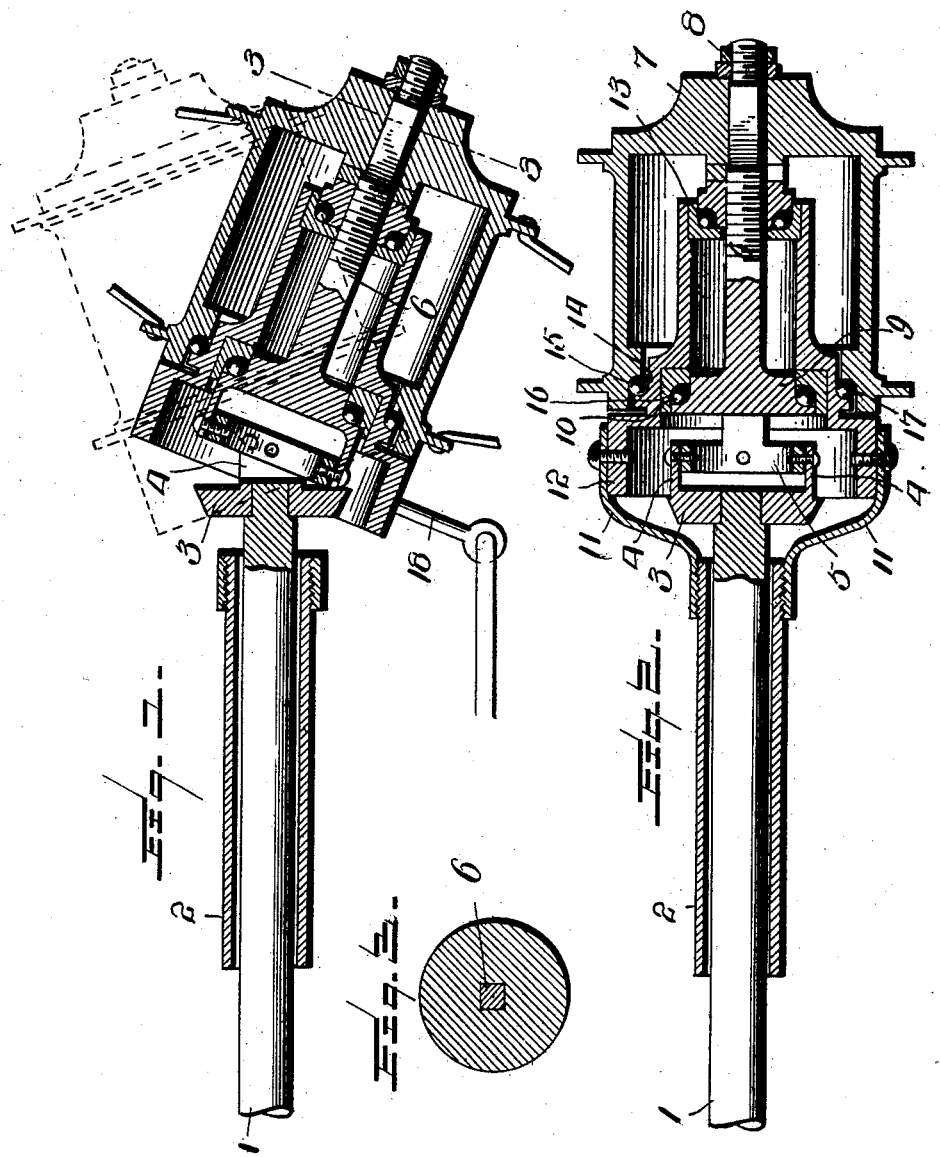
WITNESSES:
INVENTOR
Oliver Cluts
BY
Attorney

UNITED STATES PATENT OFFICE.

OLIVER CLUTS, OF CUBA, ILLINOIS.

DEVICE FOR TRANSMITTING ROTARY MOTION TO VEHICLE-WHEELS.

SPECIFICATION forming part of Letters Patent No. 717,079, dated December 30, 1902.

Application filed August 2, 1902. Serial No. 118,075. (No model.)

*To all whom it may concern:*

Be it known that I, OLIVER CLUTS, a citizen of the United States, residing at Cuba, in the county of Fulton and State of Illinois, have invented certain new and useful Improvements in Devices for Transmitting Rotary Motion to Vehicle-Wheels and for Steering the Same, of which the following is a specification.

My invention has relation to a device for transmitting rotary motion to automobile-wheels and for steering the same; and it consists in the novel construction and arrangement of its parts as hereinafter described.

The object of my invention is to provide a simple and effective means for transmitting rotary motion to the wheels of an automobile and at the same time providing a means whereby the hub of the said wheel may be turned at any desired angle in a horizontal plane.

In the accompanying drawings, Figure 1 is a horizontal sectional view of the wheel-hub, indicating the different angles it may assume in a horizontal plane with relation to the axle. Fig. 2 is a sectional view of the hub at right angles to the view shown in Fig. 1, and Fig. 3 is a transverse sectional view of the hub and spindle cut on the line 3 3 of Fig. 1.

The revolving shaft 1 is journaled in the tube 2, which forms the axle of the vehicle. The end of the shaft 1 is provided with a disk 3, which in turn is provided at its edges with the diametrically opposite parallel lugs 4 4. The ring 5 is swiveled between the lugs 4 4, and the inner end of the spindle 6 is swiveled to the ring 5 at right angles to the points at which said ring is swiveled to the lugs 4 4. The outer portion of the spindle 6 is squared and enters a square perforation in the end of the hub 7, the tap 8 being screw-threaded on the end of the spindle and holding the parts in position. The rear portion of the spindle 6 is provided with an annular shoulder 9, said shoulder having in its periphery a channel adapted to receive the balls 10. The arms 11 11 are attached at their inner ends to the tube 2, and at their outer ends are swiveled to the collar 12 in such a manner as to permit the said collar to swing in a horizontal plane only. The inner end of the said collar 12 forms a housing for the swivel connections between the spindle 6 and the shaft 1. The opposite end of the said collar passes into the interior of the hub 7 and by suitable antifriction-bearings 13 is journaled to the said spindle, the said collar also having a suitable channel 14, adapted to receive the balls 10. The inner end of the hub 7 is provided with a ball-channel 15, which receives between it and a corresponding channel 16, located on the collar 12, the balls 17. Any suitable means, such as 18, may be employed for varying the angle of the hub 7 with relation to the shaft 1. It will thus be seen that as the shaft 1 revolves rotary motion will be transmitted through the compound swivel connections to the spindle 6 and that the collar 12 is at all times prevented from revolving, but may be swung at any desired angle in a horizontal plane with relation to the axle.

Having described my invention, what I claim as new, and desire to secure by Letters Patent, is—

A device for transmitting rotary motion to vehicle-wheels and for steering the same consisting of a revolving shaft suitably journaled, a spindle swiveled to said shaft, a hub fixed at its outer edge to the outer portion of said spindle, a collar interposed between said hub and spindle and supported from a stationary point and being adapted to swing in a horizontal plane and a means for swinging said collar, a ball-bearing interposed between the outer end of the collar and the spindle and a ball-bearing interposed between the inner end of the spindle and the collar and a ball-bearing interposed between the inner edge of the hub and the collar, the hub and the collar at all other points being disconnected from each other.

In testimony whereof I affix my signature in presence of two witnesses.

OLIVER CLUTS.

Witnesses:
M. T. MOWERY,
RALL BEAM.